Jan. 13, 1925.

R. E. HOBBS

MECHANIC'S SQUARE

Filed Feb. 4, 1924

1,523,265

Inventor
Robert E. Hobbs.

By

Attorney

Patented Jan. 13, 1925.

1,523,265

UNITED STATES PATENT OFFICE.

ROBERT E. HOBBS, OF DETROIT, MICHIGAN.

MECHANIC'S SQUARE.

Application filed February 4, 1924. Serial No. 690,358.

*To all whom it may concern:*

Be it known that I, ROBERT E. HOBBS, a citizen of the United States, residing at Detroit, in the county of Wayne and State of Michigan, have invented new and useful Mechanics' Squares, of which the following is a specification.

This invention relates to mechanics' squares and more particularly to such squares having a removable scale.

Repeated removals or longitudinal adjustments of the scale in such a tool results in a wear of the seat or seats against which the scale is clamped for use, and eventually results in a deviation of the scale from its proper angular relation to the straight edge or bearing surface of the square.

It is the object of the present invention to provide the scale-holding member of a square with seats for clamping engagement by the scale, one of said seats being adjustable upon said member to compensate for wear of the seats and to eliminate any inaccuracy, resulting from such wear, in the angular relation of the scale and straight edge.

In attaining this object, the invention contemplates providing the scale holding member (which may, if desired, be rotative for protractor purposes) with seats for the scale, one of which seats has the nature of a screw adjustable to and from the scale to vary the angular relation of the scale to said member within such limits as may be necessary to correct inaccuracy due to wear either of the seat-forming face of said screw or of the fixed seat upon said member.

Figure 1:
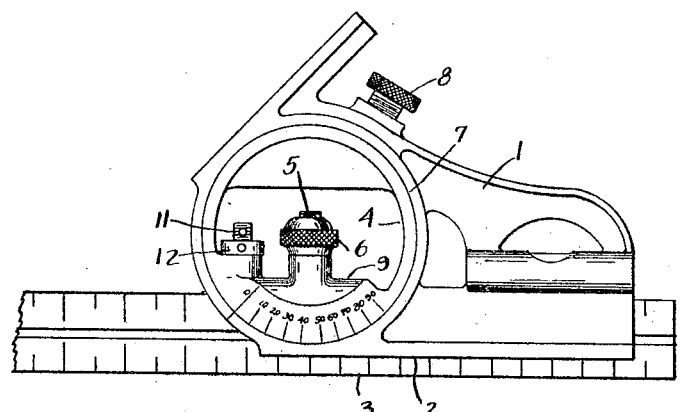

A preferred embodiment of the invention is hereinafter described and illustrated in the accompanying drawing, wherein, Fig. 1 is a view in side elevation of the improved scale.

Figure 2:
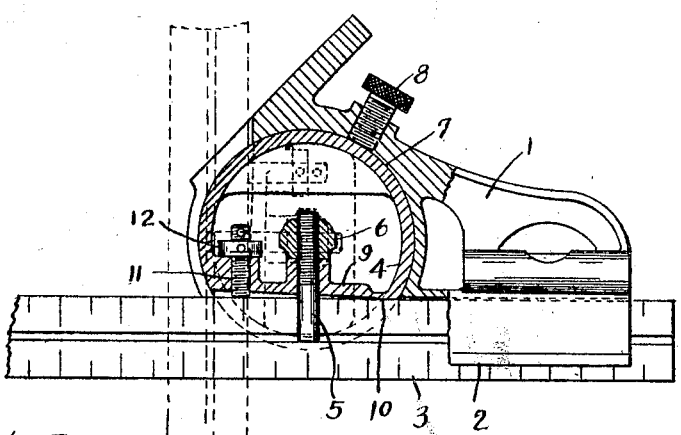

Fig. 2 is a similar view, partly in section.

In these views the reference character 1 designates the frame of the square, said frame having the usual straight edge 2. 3 is the scale, and 4 a member to which said scale is releasably secured for either removal or lengthwise adjustment, by the usual binding screw 5 engaged by a clamping nut 6. As illustrated, the member 4 is of the form of a ring and is rotatable for protractor purposes in a circular opening 7 in the frame 1, a set screw 8 being mounted in the frame radially to the member 4 to clamp said member in a selected position of rotative adjustment. This protractor feature is, however, well-known and is not essential to the present invention. The member 4 has an integral portion 9 positioned to form a chord to the circle formed by said member. Said chord portion at one end has its outer face raised slightly as indicated at 10 to provide a seat for the scale 3 at one side of the binding screw 5, and a screw 11, threaded transversely through the other end portion of the chord 9 terminally forms a companion seat for said scale upon the opposite side of said binding screw. 12 is a lock nut upon the screw 11, adapted to clamp upon the inner face of the chord 9.

In the use of the described invention when either or both of the seats 10 and 11 become so worn due to repeated removals of the scale 3 from the member 4, or adjustments of the scale longitudinally in said member, that any appreciable inaccuracy results in the angular relation of the scale to the straight edge 2, such inaccuracy is quickly remedied by simply loosening the lock-nut 12 and turning the screw 11 until the proper position of the scale is re-established. When the square is of a protractor type, such as illustrated, the adjustment may be effected by rotating the scale-holder 4 to a position indicating a zero angle, clamping said holder in such position by the set-screw 8, and then adjusting the screw 11 to establish the scale 3 in parallelism to the straight-edge 2.

What I claim is:—

1. A mechanic's square comprising a frame having a straight edge, a scale, a scale holding member carried by the frame, having an integral portion for seating the scale, and a companion seat member for the scale, carried by said member and adjustable to vary the angular relation of the scale to said member and to said straight edge.

2. A mechanic's square as defined in claim 1, one of said seat members being a screw terminally bearing upon the scale.

3. A mechanic's square comprising a frame having a straight edge, a scale, a scale-holding member rotatably mounted in said frame, means for clamping said member in a selective rotative position in said frame, clamping means securing said scale in the rotative member, and an element mounted in the rotative member against which said scale is clamped, said element being adjustable to or from the scale to vary the angular relation of the scale to the rotative member and to said straight edge.

4. A mechanic's square comprising a scale holder having a straight edge, a scale carried by said holder, said holder having an integral seat for the scale, and a companion seat for said scale adjustable in said holder to vary the angular relation of said scale to the straight edge of said holder.

5. A mechanic's square comprising a scale, a scale holder having a straight edge, clamping means releasably binding said scale upon said holder, said scale holder having a stationary bearing for said scale at one side of the clamping means, and a companion bearing at the opposite side of said clamping means adjustably engageable with said scale to regulate the clamped relation thereof to the straight edge of said holder.

In testimony whereof I sign this specification.

ROBERT E. HOBBS.